(12) United States Patent
Thagadur Shivappa et al.

(10) Patent No.: US 9,905,233 B1
(45) Date of Patent: Feb. 27, 2018

(54) METHODS AND APPARATUS FOR FACILITATING AMBIENT CONTENT RECOGNITION USING DIGITAL WATERMARKS, AND RELATED ARRANGEMENTS

(71) Applicant: Digimarc Corporation, Beaverton, OR (US)

(72) Inventors: Shankar Thagadur Shivappa, Tualatin, OR (US); Tony F. Rodriguez, Portland, OR (US); Kurt M. Eaton, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/821,435

(22) Filed: Aug. 7, 2015

Related U.S. Application Data

(60) Provisional application No. 62/034,340, filed on Aug. 7, 2014.

(51) Int. Cl.
*G06F 17/00* (2006.01)
*G10L 19/018* (2013.01)
*G06F 21/16* (2013.01)
*G06T 1/00* (2006.01)
*H04N 21/8358* (2011.01)

(52) U.S. Cl.
CPC ............ *G10L 19/018* (2013.01); *G06F 21/16* (2013.01); *G06T 1/0071* (2013.01); *H04N 21/8358* (2013.01)

(58) Field of Classification Search
CPC ..... G06F 21/16; G06T 1/0071; G10L 19/018; H04N 21/8358
See application file for complete search history.

(56) References Cited

U.S. PATENT DOCUMENTS

| 4,230,990 | A | 10/1980 | Lert, Jr. | |
| 5,210,820 | A | 5/1993 | Kenyon | |
| 5,862,260 | A | 1/1999 | Rhoads | |
| 5,918,223 | A | 6/1999 | Blum et al. | |
| 6,122,403 | A * | 9/2000 | Rhoads | G06F 17/30876 382/233 |
| 6,483,927 | B2 | 11/2002 | Brunk et al. | |
| 6,614,914 | B1 * | 9/2003 | Rhoads | G06F 17/30876 382/100 |
| 6,674,876 | B1 | 1/2004 | Hannigan | |

(Continued)

FOREIGN PATENT DOCUMENTS

| EP | 161512 | 7/1989 |
| JP | 2004/0178592 | 6/2004 |

(Continued)

OTHER PUBLICATIONS

European Search Report dated Jan. 3, 2013, from European Application No. 10778493.6.

(Continued)

*Primary Examiner* — Thomas Maung
(74) *Attorney, Agent, or Firm* — Digimarc Corporation

(57) ABSTRACT

The present disclosure relates generally to signal processing techniques for content signals such as audio, images and video signals. More particularly, the present disclosure relates to processing content signals to facilitate recognition of ambient content signals using digital watermarks and/or digital fingerprints.

14 Claims, 6 Drawing Sheets

(56) References Cited

U.S. PATENT DOCUMENTS

| | | |
|---|---|---|
| 6,711,293 B1 | 3/2004 | Lowe |
| 6,963,975 B1 | 11/2005 | Weare |
| 6,990,453 B2 | 1/2006 | Wang et al. |
| 7,013,301 B2 | 3/2006 | Holm et al. |
| 7,020,304 B2 | 3/2006 | Alattar et al. |
| 7,167,857 B2 | 1/2007 | Roberts |
| 7,168,083 B2 | 1/2007 | Kalker et al. |
| 7,174,293 B2 | 2/2007 | Kenyon et al. |
| 7,271,747 B2 | 9/2007 | Baraniuk et al. |
| 7,277,766 B1 | 10/2007 | Khan et al. |
| 7,289,643 B2 | 10/2007 | Brunk et al. |
| 7,346,472 B1 | 3/2008 | Moskowitz et al. |
| 7,346,512 B2 | 3/2008 | Li-Chun Wang et al. |
| 7,412,072 B2 | 8/2008 | Sharma et al. |
| 7,421,305 B2 | 9/2008 | Burges et al. |
| 7,424,131 B2 | 9/2008 | Alattar et al. |
| 7,511,643 B2 | 3/2009 | Baraniuk et al. |
| 7,519,819 B2 | 4/2009 | Bradley et al. |
| 7,590,035 B1 | 9/2009 | Holm |
| 7,698,254 B2 | 4/2010 | Grabowski et al. |
| 7,749,052 B2 | 7/2010 | Yi et al. |
| 7,788,279 B2 | 8/2010 | Mohjer et al. |
| 7,853,664 B1 | 12/2010 | Wang et al. |
| 7,907,211 B2 | 3/2011 | Oostveen et al. |
| 7,916,052 B2 | 3/2011 | Yeh et al. |
| 8,020,000 B2 | 9/2011 | Oostveen et al. |
| 8,071,869 B2 | 12/2011 | Chen et al. |
| 8,094,872 B1 | 1/2012 | Yagnik et al. |
| 8,171,030 B2 | 5/2012 | Pereira et al. |
| 8,199,244 B2 | 6/2012 | Baraniuk et al. |
| 8,300,884 B2 | 10/2012 | Sharma |
| 8,326,584 B1 | 12/2012 | Wells et al. |
| 8,488,838 B2 | 7/2013 | Sharma |
| 8,648,742 B2 | 2/2014 | Khajehnejad et al. |
| 8,660,267 B2 | 2/2014 | Oostveen et al. |
| 8,660,581 B2 | 2/2014 | Davis et al. |
| 8,686,271 B2 | 4/2014 | Wang et al. |
| 8,688,253 B2 | 4/2014 | Master et al. |
| 8,700,407 B2 | 4/2014 | Wang et al. |
| 8,908,909 B2 | 12/2014 | Sharma |
| 9,280,977 B2 | 3/2016 | Sharma |
| 2002/0159614 A1 | 10/2002 | Bradley et al. |
| 2002/0178410 A1 | 11/2002 | Haitsma et al. |
| 2003/0185417 A1 | 10/2003 | Alattar |
| 2005/0273612 A1 | 12/2005 | Van Der Veen et al. |
| 2006/0031684 A1 | 2/2006 | Sharma et al. |
| 2006/0062426 A1 | 3/2006 | Levy et al. |
| 2006/0122839 A1* | 6/2006 | Li-Chun Wang . G06F 17/30743 704/273 |
| 2006/0177096 A1 | 8/2006 | Malik et al. |
| 2006/0239502 A1 | 10/2006 | Petrovic et al. |
| 2006/0280246 A1 | 12/2006 | Alattar et al. |
| 2007/0208711 A1 | 9/2007 | Rhoads et al. |
| 2007/0220265 A1 | 9/2007 | Lemma et al. |
| 2007/0253594 A1 | 11/2007 | Lu et al. |
| 2008/0154401 A1 | 6/2008 | Wang |
| 2008/0167862 A1 | 7/2008 | Mohajer |
| 2008/0174570 A1 | 7/2008 | Jobs et al. |
| 2008/0250240 A1 | 10/2008 | Celik |
| 2009/0022360 A1 | 1/2009 | Bradley |
| 2009/0116686 A1 | 5/2009 | Samtani et al. |
| 2009/0285492 A1 | 11/2009 | Ramanujapuram et al. |
| 2010/0322469 A1* | 12/2010 | Sharma ............... G10L 19/018 382/100 |
| 2012/0028577 A1 | 2/2012 | Rodriguez et al. |
| 2012/0214544 A1 | 8/2012 | Shivappa |
| 2013/0160038 A1 | 6/2013 | Slaney et al. |
| 2014/0108020 A1 | 4/2014 | Sharma et al. |
| 2014/0142958 A1 | 5/2014 | Sharma et al. |
| 2015/0016661 A1 | 1/2015 | Lord |
| 2015/0156369 A1 | 6/2015 | Reed et al. |

FOREIGN PATENT DOCUMENTS

| | | |
|---|---|---|
| WO | WO2005071870 | 8/2005 |
| WO | WO2005124679 | 12/2005 |

OTHER PUBLICATIONS

PCT/US10/035834 Search Report and Written Opinion dated May 21, 2009.

Bhat, D. N. and Nayar, S. K., "Ordinal measures for image correspondence," IEEE Trans. Pattern Ana. mach. Intell., vol. 20, No. 4, pp. 415-423, Apr. 1998.

Mohan, R., "Video sequence matching,"Proc. Int. Conf. Acoust., Speech and Signal Processing (ICASSP), vol. 6, pp. 3697-3700, Jan. 1998.

Oostveen, J., Kalker, T. and Haitsma, J., "Feature extraction and a database strategy for video fingerprinting," Proc. 5th Int. Conf. Recent Advance in Visual Information Systems, pp. 117-128, 2002.

Kim C. and Vasudev B., "Spatiotemporal sequence matching for efficient video copy detection," IEEE Trans. Circuits Syst. Video Technol., vol. 15, No. 1, pp. 127-132, Jan. 2005.

Lu J., "Video fingerprinting for copy identification: from research to industry applications", Proceedings of SPIE, Media Forensics and Security, vol. 7254, Feb. 2009.

Lowe, "Distinctive Image Features from Scale-Invariant Keypoints," International Journal of Computer Vision, 60, 2 (2004), pp. 91-110.

Lowe, "Object Recognition from Local Scale-Invariant Features," International Conferenceon Computer Vision, Corfu, Greece (Sep. 1999), pp. 1150-1157.

Bonato et al, "Parallel Hardware Architecture for Scale and Rotation Invariant Feature Detection," IEEE Tran on Circuits and Systems for Video Tech, vol. 18, No. 12, 2008.

Se et al, "Vision Based Modeling and Localization for Planetary Exploration Rovers," Proc. of Int. Astronautical Congress (IAC), Oct. 2004.

Mikolajczyk et al, "Performance Evaluation of Local Descriptors," IEEE Trans. Pattern Anal. Mach. Intell., vol. 27, No. 10, pp. 1516-1630, 2005.

Bay et al. "SURF: Speeded Up Robust Features," Eur. Conf. on Computer Vision (1), pp. 404-417, 2006.

Chen et al, "Efficient Extraction at Robust linage Features on Mobile Devices," Proc. of the 6.sup.th IEEE and ACM Int. Symp. on Mixed and Augmented Reality, 2007.

Takacs et al, "Outdoors Augmented Reality on Mobile Phone Using Loxel-Based Visual Feature Organization," ACM Int. Conf. on Multimedia Information Retrieval, Oct. 2008.

L.G. Brown, "A survey of image registration techniques", ACM. Compiling Surveys 24 (1992) 326-376.

I. J. Cox, M. L. Miller, and J. A, Bloom, "Digital watermarking," Chapter 5—Watermarking with Side Information, Morgan Kaufmann, 2001.

Beauget et al. "Informed Detection of Audio Watermark for Resolving Playback Speed Modifications", Proceedings of the Multimedia and Security Workshop Ommultimedia and Security, Sep. 20, 2004.

Shih-Wei Sun et al, "Video Watermarking Synchronization Based on Profile Statistics", Oct. 14, 2003.

Ramaswamy, "Solving the Content Identification Problem for Digital TV", SPIE Newsroom, Dec. 30, 2008.

Wang, An Industrial-Strength Audio Search Algorithm, Int'l Conf. on Music Information Retrieval, ISMIR 2003, Oct. 2003.

Cano et al, "A Review of Audio Fingerprinting," Journal of VLSI Signal Processing, 41, 271-284, Nov. 2005.

Kim et al, "Spatiotemporal Sequence Matching for Efficient Video Copy Protection," IEEE Trans. on Circuits and Systems for Video Technology, vol. 15, No. 1, Jan. 2005, pp. 127-132.

Notification of Allowance dated May 28, 2015; allowed claims; dated Feb. 2, 2015 office action; dated Aug. 4, 2014 office action for Chinese Application No. 201080032461.7.

Office Action dated Dec. 4, 2013 for Chinese Application No. 201080032461.7.

(56) References Cited

OTHER PUBLICATIONS

Office Action dated May 9, 2014 for European Application No. 10778493.6.
Allowed Claims and Office Action dated Apr. 22, 2014 in Japanese Application No. 2012-512069.

* cited by examiner

METHODS AND APPARATUS FOR FACILITATING AMBIENT CONTENT RECOGNITION USING DIGITAL WATERMARKS, AND RELATED ARRANGEMENTS

RELATED APPLICATION DOCUMENTS

This application claims benefit of Provisional Application 62/034,340, filed Aug. 7, 2014, which is hereby incorporated herein by reference in its entirety.

TECHNICAL FIELD

Embodiments disclosed herein relate generally to processing of content signals and, more particularly, to processing content signals to facilitate recognition of ambient content signals using digital watermarks.

BACKGROUND

Recent years have seen a marked increase in the use of automatic recognition of media such as music or other audio (collectively and generically referred to herein as "content" or "content signals") generated from a variety of sources. For example, owners of copyrighted works or advertisers can apply automatic content recognition techniques to obtain data on the frequency of broadcast of their material. Music tracking services can provide playlists of major radio stations in large markets. Consumers can identify content such as songs, television shows, movies, advertising, etc., broadcast on the radio or television, streamed over the Internet, played from a CD or DVD, etc., and rendered (i.e., played) via a loudspeaker. Once identified, consumers can purchase or gain access to new and interesting music or other products and services, as well as access meta-data (e.g., artist, song title, show title, episode, etc., corresponding to the content).

Content recognition techniques commonly rely upon various content fingerprinting algorithms to compute or derive one or more "fingerprints" that characterize a content signal. As commonly understood, the "fingerprint" of a content signal represents one or more salient features of that content signal at or near a particular anchor or landmark therein. Within the field of content recognition, it is commonly understood that a "salient feature" of a content signal is an intrinsic characteristic of the content signal and not to extrinsic features (e.g., title, identification number, author, publication date, etc.) which may describe or otherwise be assigned to or associated with the content signal. Recognition of a sampled content signal is carried out by identifying one or more fingerprints derived from a known content signal that sufficiently corresponds to, or matches, one or more fingerprints derived from the sampled content signal.

Frequently, content signals are sampled as they are rendered so as to be present within the ambient, aural environment. However, the aural environment in which a content signal is rendered may undesirably contain ambient noise (e.g., people talking, coffee grinders grinding, espresso machines brewing, doors slamming, sirens blaring, etc.), acoustic reflections, reverberations, etc., that can be captured with the sampled content signal and incorporated into the derived fingerprint (or otherwise recorded as a fingerprint) for the sample. The presence of such environment-influenced fingerprints can undesirably affect accurate and reliable identification of the sampled content signal. Similarly, rendering a content signal below a certain "loudness" or sound pressure level (either in absolute terms, or relative to other sounds present within the aural environment), then conventional content recognition techniques may have problems accurately and reliably identifying the content signal. Further, the manner in which the content signal is rendered or sampled can introduce temporal distortion (e.g., time scaling) in a manner that can undesirably affect accurate and reliable identification of the sampled content signal. Thus conventional content recognition techniques can exhibit undesirably low robustness in the presence of degradation sources such as background noise, acoustic reflections, and channel distortion. It was a recognition of these and other problems associated with conventional content recognition techniques that formed the impetus of the embodiments exemplarily disclosed herein.

DETAILED DESCRIPTION

I. Introductory Remarks

Figure 1:
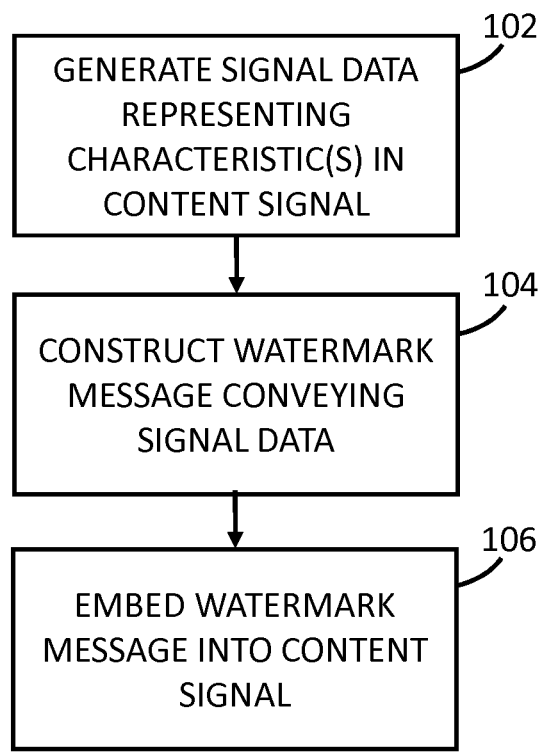
FIG. 1 illustrates a flow diagram describing an example method for generating a content signal having a digital watermark embedded therein.

Although the following detailed description contains many specifics for the purposes of illustration, those of ordinary skill in the art will appreciate that many variations and alterations to the following details are within the scope of any invention as set forth in the claims. Accordingly, the following embodiments of the invention are set forth without any loss of generality to, and without imposing limitations upon, any claimed invention. The detailed description is organized by section headings. Of course, these heading are merely to aid the reader and should not impose limitations by themselves as subject matter under one such section heading can be readily combined with subject matter under another such heading.

As used herein, the terms "a" and "an" means "one or more" unless the context clearly indicates otherwise. It will be further understood that the terms "comprises" and "comprising," when used in this specification, specify the presence of stated features, integers, steps, acts, operations, elements, components or devices, but do not preclude the presence or addition of one or more other features, integers, steps, acts, operations, elements, components or devices, or groups thereof. Unless otherwise specified, a range of values, when recited, includes both the upper and lower limits of the range, as well as any sub-ranges there between.

It will be understood that, although the terms first, second, etc., may be used herein to describe various elements, components, regions, devices, acts, etc., these elements, components, regions, devices, acts, etc., should not be limited by such terms. These terms are only used to distinguish one element, component, region, device, act, etc., from another. Thus, a first element, component, region, device, act, etc., discussed below could be termed a second element, component, region, device, act, etc., without departing from the teachings of the embodiments exemplarily described herein.

Embodiments disclosed herein generally relate to the construction and embedding of digital watermarks into content signals (e.g., including media such as music or other audio such as speech, sound effects, etc.), thereby creating watermarked content signals. In some embodiments, a digital watermark can convey signal data representing one or more characteristics of the content signal in which it is embedded (thus, the signal data is dependent upon one more salient features of its corresponding content signal). In other embodiments, the digital watermark can convey data other than the salient features of its corresponding content signal).

Embodiments disclosed herein also generally relate to determining whether a known content signal is present within a sample of ambient content. Typically, the ambient content includes rendered content signals such as music or other audio (e.g., speech, sound effects, etc.) present within the ambient, aural environment (e.g., as one or more propagating sound waves) surrounding a user device. A sample of such ambient content can be obtained by capturing the propagating sound wave(s) using one or more sensors (e.g., microphone(s)) associated with the user device, and the sensor(s) then convert the captured sound into one or more corresponding signals (typically, electrical signals, which may also be referred to as "sensor signals"). As used herein, the device which captures the ambient content is also referred to as the "capture device." A capture device can include one or more suitably-equipped electronic devices such as a smartphone, a tablet computer, a laptop computer, a desktop computer, a personal media player, a personal navigation device, a wearable electronic device (e.g., any finger-, wrist-, arm-, leg-, torso-, neck- ear-, head-mountable device, of the like often used for providing a user visual, audible, or tactile notifications regarding incoming email, voicemail, text message, appointments, alerts, etc., for providing a user with the current time-of-day, for providing a user with biofeedback, for tracking or monitoring of a user's physiological function or physical activity, for facilitating hand-free communications via telephone, email, text messaging, etc.), or the like or any combination thereof For purposes of discussion, it is generally assumed that there is—at least—a possibility of a watermarked content signal being present within the ambient environment and, consequently, that the ambient content might include a watermarked content signal. As will be discussed in greater detail below, information obtained upon detecting the presence of a watermarked content signal within the sampled ambient content (and, optionally, upon decoding the watermarked content signal) can be used to help determine whether a known content signal is present within the sampled ambient content.

II. Embedding Watermarks within Content Signals

Referring to FIG. 1, one example of a method for generating a content signal having a watermark embedded therein, such as method 100, includes generating data (also referred to herein as "signal data") representing one or more characteristics of the content signal (102). Some example methods by which signal data can be generated are described in more detail with respect to FIGS. 3 to 7. Thereafter, a watermark message conveying the signal data is constructed (104) and subsequently embedded into the content signal (106) using one or more suitable or desirable digital watermarking techniques, thereby producing a watermarked content signal.

a. Characteristics of Content Signals

As used herein, a "characteristic" of a content signal can include an anchor (also known as a "landmark"), a fingerprint, or the like or a combination thereof. Generally, a characteristic of a content signal can be computed, derived, identified or otherwise obtained by first analyzing the content signal. In one embodiment, the content signal can be analyzed by computing a multidimensional function of the content signal, wherein at least one of the dimensions of the multidimensional function is a time dimension, a non-time dimension, or any combination thereof. Examples of non-time dimensions include a frequency dimension, a phase dimension, an amplitude dimension, an energy dimension, etc. One or more characteristics of the content signal are then extracted from the multidimensional function based on at least one salient feature computed, derived, identified or otherwise obtained from the multidimensional function.

Generally, an anchor represents a temporal location in a content signal that corresponds to at least one fingerprint of the content signal. Typically, the location represented by an anchor is determined by the content signal itself (i.e., is dependent upon qualities of the content signal), and is reproducible (i.e., the same anchor can be obtained for the same content signal each time it is computed, derived, identified or otherwise obtained). Thus, an anchor may be characterized as a particular type of salient feature of the content signal. In one embodiment, an anchor is computed, derived, identified or otherwise obtained from as at least one salient feature or point in at least one time dimension of the aforementioned multidimensional function, and can be represented as a timepoint value. A timepoint value can describe a point in time when the anchor is present in the content signal in absolute manner (e.g., relative to the beginning or end of the content signal), in a relative manner (e.g., relative to some other anchor or landmark in the content signal), or the like or any combination thereof. Examples of salient features for anchors can include local maxima, a local minima, and zero crossings of the multidimensional function in at least one dimension thereof, etc.

Generally, a fingerprint corresponds to an anchor and characterizes one or more salient features of the content signal at or near the corresponding anchor. The "nearness" of a salient feature to an anchor can be defined by the technique by which the fingerprint is computed, derived, identified or otherwise obtained. In some cases, a salient feature is considered to be near an anchor if it clearly corresponds to the anchor and not to a closest adjacent anchor. In other cases, salient features can correspond to multiple adjacent or neighboring anchors. Thus, a fingerprint can be computed from at least one salient feature in one or more non-time dimensions (e.g., a frequency dimension, etc.), from a plurality of salient features in one or more time dimensions, or the like or any combination thereof, and is typically represented as a numerical index value (e.g., a hashed fingerprint value). Examples of salient of features for fingerprints can include spectral slice fingerprints, multi-slice fingerprints, LPC coefficients, cepstral coefficients, frequency components of formants, linked formants, etc.

Notwithstanding the above, it will be appreciated that characteristics of content signals may be derived, and values (e.g., timepoint values, fingerprint values, etc.) representing the same may be generated, in any suitable or desired manner. Examples of techniques that may be used to derive or otherwise generate such data include those used by companies or services such as ACOUSTID, AMAZON, AUDIBLE MAGIC, AUDIOID, AXWAVE, GRACENOTE, MELODIS, MICROSOFT, PREDIXIS, LAST.FM, SHAZAM, SOUNDHOUND, YOUTUBE'S Content ID, or the like or any combination thereof. Other examples of techniques that may be used to derive or otherwise generate such data include those described in U.S. Pat. Nos. 5,918, 223, 6,963,975, 6,990,453, 7,013,301, 7,167,857, 7,277,766, 7,590,035, 7,749,052, 7,421,305, 7,698,254, 7,788,279, 7,853,664, 7,907,211, 8,020,000, 8,071,869, 8,326,584, 8,660,267, 8,686,271, 8,688,253, and 8,700,407 and U.S. Patent App. Pub. Nos. 2008/0167862, and 2013/0160038, each of which is incorporated herein by reference in its entirety.

b. Constructing Watermark Messages

Signal data generated from a content signal can be embedded into the content signal by first constructing a watermark message (e.g., a series of symbols including binary symbols, M-ary symbols, etc., that can represent the signal data). Unless otherwise indicated in this disclosure, the signal data represents one or more characteristics (e.g., anchors, fingerprints, etc.) of the content signal, but not represent the aforementioned values (e.g., timepoint values, fingerprint values, etc.) that are conventionally used to represent anchors, fingerprints, etc.

In addition to the signal data, the watermark message can also convey a set of error detection symbols such as Cyclic Redundancy Check (CRC) symbols. To construct the watermark message, the data intended to be conveyed is coded according to one or more error correction coding methods. Examples of error correction coding include block codes (e.g., BCH, Reed Solomon, etc.), convolution codes, turbo codes or combinations thereof.

Some forms of error correction, such as, convolution coding, perform error correction in a manner that depends on subsequent data in the watermark message. Thus in one embodiment, data at the end of the string are error correction decoded with less confidence because there are fewer or no symbols following them. This attribute of error correction coding schemes that have "memory" can be mitigated by repeating parts of the watermark message that are more susceptible to errors due to the lack of memory than other parts of the message symbol string. This typically leads to repetition of the tail of the watermark message more than the beginning of the watermark message. By repeating parts of the watermark message as discussed above, the ability for the watermark message to be accurately and reliably detected and read can be further enhanced.

Exemplary techniques that may be used to construct watermark messages are described in U.S. Pat. Nos. 5,862, 260, 6,614,914, 6,674,876, 7,020,304, 7,412,072, 7,424,131, 8,488,838, and 8,660,581, U.S. Patent App. Pub. Nos. 2012/ 0214544, 2014/0108020, 2014/0142958, 2015/0016661, each of which is incorporated herein by reference in its entirety.

c. Embedding Watermark Messages

Once constructed, the watermark message is typically much smaller than the overall size of the content signal. For example, watermark messages are typically 32 to 96 bits (e.g., 64 bits) in length, but may carry more than 96 bits or fewer than 32 bits. As a result, multiple instances of the same watermark message can be embedded throughout the content signal to make it more robust to errors that undermine its complete and accurate recovery in potentially distorted or noisy versions of the watermarked content signal. In one embodiment, the energy with which each instance of the watermark message is embedded into the content signal is sufficiently low so as to ensure that the watermark message will not be identified as a "characteristic" of the content signal. Further, multiple instances of the watermark message can be typically embedded into the content signal so as to be at least substantially imperceptible in the content signal. Once embedded within a content signal, the watermark message can be referred to as a "watermark signal." Exemplary techniques that may be used to embed watermark messages in content signals are described in the aforementioned U.S. Pat. Nos. 5,862,260, 6,614,914, 6,674,876, 7,020,304, 7,412,072, 7,424,131, 8,488,838, and 8,660,581, and in U.S. Patent App. Pub. Nos. 2012/0214544, 2014/ 0108020, 2014/0142958, 2015/0156369, 2015/0016661, and U.S. patent application Ser. No. 14/725,399, filed May 29, 2015 (published as 2016/0275639), each of which is hereby incorporated herein by reference in its entirety.

d. Additional Remarks

Generally, the acts of generating the signal data (102), constructing the watermark message conveying the signal data (104) and embedding the signal data into the content signal from which it was derived (106) are performed by one or more processors associated with the same device (e.g., a device such as smartphone, a tablet computer, a laptop computer, a desktop computer, a server, etc.). It will be appreciated however, that any of these acts (or any portion of these acts) may be performed by one or more processors associated with two or more different devices communicatively coupled to one another via one or more suitable wired links (e.g., via Ethernet, USB, FireWire, etc.), one or more suitable wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (visible light communication), sonic or ultrasonic communication, etc.), or the like or any combination thereof.

In addition, one or more signal processing operations used to compute, derive, identify or otherwise obtain characteristics of the content signal (or the results therefrom) may be used to facilitate embedding of the watermark message into the content signal. For example, the results of signal processing operations which perform frequency-domain transformation of the content signal, which may be used to facilitate compute, derive, identify or otherwise obtain characteristics of the content signal at (102) may be used to facilitate embedding of watermark messages into the content signal at (106). Characteristics of the content signal (e.g., local peaks, etc.) computed, derived, identified or otherwise obtained at (102) may be used for perceptual modeling purposes (e.g., to facilitate at least substantially imperceptible embedding of the watermark message during embedding at (106)). Additional discussion of these and other techniques is described in the aforementioned U.S. Pat. No. 8,488,838 and U.S. Patent App. Pub. Nos. 2014/0108020 and 2014/0142958.

i. Post-Embedding Activities

Once produced, the watermarked content signal may be output in any suitable or desirable manner. For example, the watermarked content signal may be rendered (e.g., played over a loudspeaker) via one or more loud speakers associated with a public address (PA) system, a retail store sound system, a movie theater sound system, a home-theater surround-sound system, a television, a telephone, a desktop computer, a laptop computer, a tablet computer, a smartphone, a personal media player, a personal navigation device, a cell phone, a wearable electronic device, or the like or any combination thereof. The device(s) associated with the loudspeaker(s) where the rendering is performed and the device(s) associated with the processor(s) that performed any of the acts (102), (104) or (106) may be the same or different. In one embodiment, the entity that renders the watermarked content signal may be same as an entity that performed any of the acts (102), (104) or (106). In another embodiment, the entity that renders the watermarked content signal may be different from the entity that performed any of the acts (102), (104) or (106).

In another example, the watermarked content signal may be stored on any suitable tangible storage medium such as semiconductor memory (e.g., a volatile memory SRAM, DRAM, or the like or any combination thereof, a non-volatile memory such as PROM, EPROM, EEPROM, NVRAM (also known as "flash memory", etc.), magnetic memory (e.g., a floppy disk, hard-disk drive, magnetic tape, etc.), optical memory (e.g., CD-ROM, CD-R, CD-RW, DVD, Holographic Versatile Disk (HVD), Layer-Selection-Type Recordable Optical Disk (LS-R), etc.), or the like or any combination thereof. Relatedly, the corresponding watermark message itself, signal data, or the like or any combination thereof may be stored (either by itself or in association with the corresponding watermarked content signal). The device(s) associated with the tangible storage medium where the watermarked content signal (or other data related thereto, as described above) is stored and the device(s) associated with the processor(s) that performed any of the acts (102), (104) or (106) may be the same or different.

In yet another example, the watermarked content signal may be broadcast, streamed or otherwise transmitted to one or more devices via any suitable medium (e.g., via over-the-air television or radio broadcast network, cable television or radio distribution network, fiber-optic communication network, a wired or wireless link as described above, or the like or any combination thereof). Once transmitted, the watermarked content signal can be rendered, stored or retransmitted in any suitable or desired manner. The device(s) from which the watermarked content signal is transmitted and the device(s) associated with the processor(s) that performed any of the acts (102), (104) or (106) may be the same or different.

ii. Auxiliary Data

In addition to generating signal data representing one or more characteristics of the content signal, auxiliary data may be generated. Examples of auxiliary data include data that is independent of salient features of the content signal, data describing an identity of an entity that will generate (or that has generated, or that is otherwise responsible for generating) the signal data for a content signal (e.g., the identity of an owner/operator of a retail, restaurant or hospitality environment, a media producer, distributor, broadcaster, streaming service, etc., a marketing or advertising company, the author of the content signal, a sponsor, an administrator of a content recognition service, etc.), an identity of an entity that will embed (or that has embedded, or that is otherwise responsible for embedding) the watermark message (e.g., the identity of an owner/operator of a retail, restaurant or hospitality environment, a media producer, distributor, broadcaster, streaming service, etc., a marketing or advertising company, the author of the content signal, a sponsor, an administrator of a content recognition service, etc.), an identity of an entity that will distribute or render (or that has distributed or rendered, or that is otherwise responsible for distributing or rendering) the watermarked content signal (e.g., the identity of an owner/operator of a retail, restaurant or hospitality environment, a media producer, distributor, broadcaster, streaming service, etc., a marketing or advertising company, the author of the content signal, a sponsor, etc.), data describing an identity of an entity on whose behalf the signal data was generated, on whose behalf the watermark message was embedded, or on whose behalf the watermarked content signal was distributed or rendered, etc., data describing an identity of the anchor (e.g., as a timepoint value thereof) conveyed by the watermark message as signal data, data describing an identity of the watermark message embedded into the content signal, data describing bibliographic or other identifying information relating to the content signal (e.g., title, artist, publication date, etc.), data describing a location corresponding to a venue where the watermark message was embedded into the content signal, data describing a location corresponding to a venue where the watermarked content signal was rendered, data describing an anchor location within the content signal as represented by the signal data, data describing a time when signal data was generated for a content signal, when a watermark message was embedded into the content signal, when a watermarked content signal was rendered, etc., any other content signal (e.g., including an audio signal, image signal, video signal, etc., text file, CAD file, 3D printer file in formats such as STL, IGES, OBJ, 3DS, etc., or the like or any combination thereof), haptic signature file (e.g., as described in U.S. Patent App. Pub. No. 2012/0028577, which is incorporated herein by reference in its entirety) or other information (e.g., a fingerprint value, a timepoint value not associated with an anchor represented by the signal data, or the like or any combination thereof), metadata (e.g., as described in aforementioned 2015/0016661) or machine-executable instruction, or an IP address, URL, database index or other link to any of the foregoing examples, or the like or any combination thereof. In one embodiment, the auxiliary data could be provided as an identifier comprising a hash of any of the examples of auxiliary data given above.

Generally, any of the aforementioned auxiliary data may be generated before or after a watermark message has been embedded into its corresponding content signal. Likewise, any of the aforementioned auxiliary data may be generated before or after a corresponding watermarked content signal has been rendered or stored. Once generated, the auxiliary data can be stored, either by itself or in association with the corresponding content signal, the corresponding watermarked content signal, the corresponding watermark message or signal data, or the like or any combination thereof. In one embodiment, such data may be stored on any suitable or desired tangible storage medium as described above. Such data may be stored at the request of any entity that performed any of the acts (102), (104) or (106), with any entity responsible for rendering the watermarked content signal, with any entity that administers a content recognition service (e.g., a company such as AMAZON, SHAZAM, SOUNDHOUND, etc.), or the like or any combination thereof. Optionally, the watermark message can be constructed to convey the auxiliary data in addition to the signal data.

III. Identifying Content Signals in Ambient Content Using Watermarks

Figure 2:
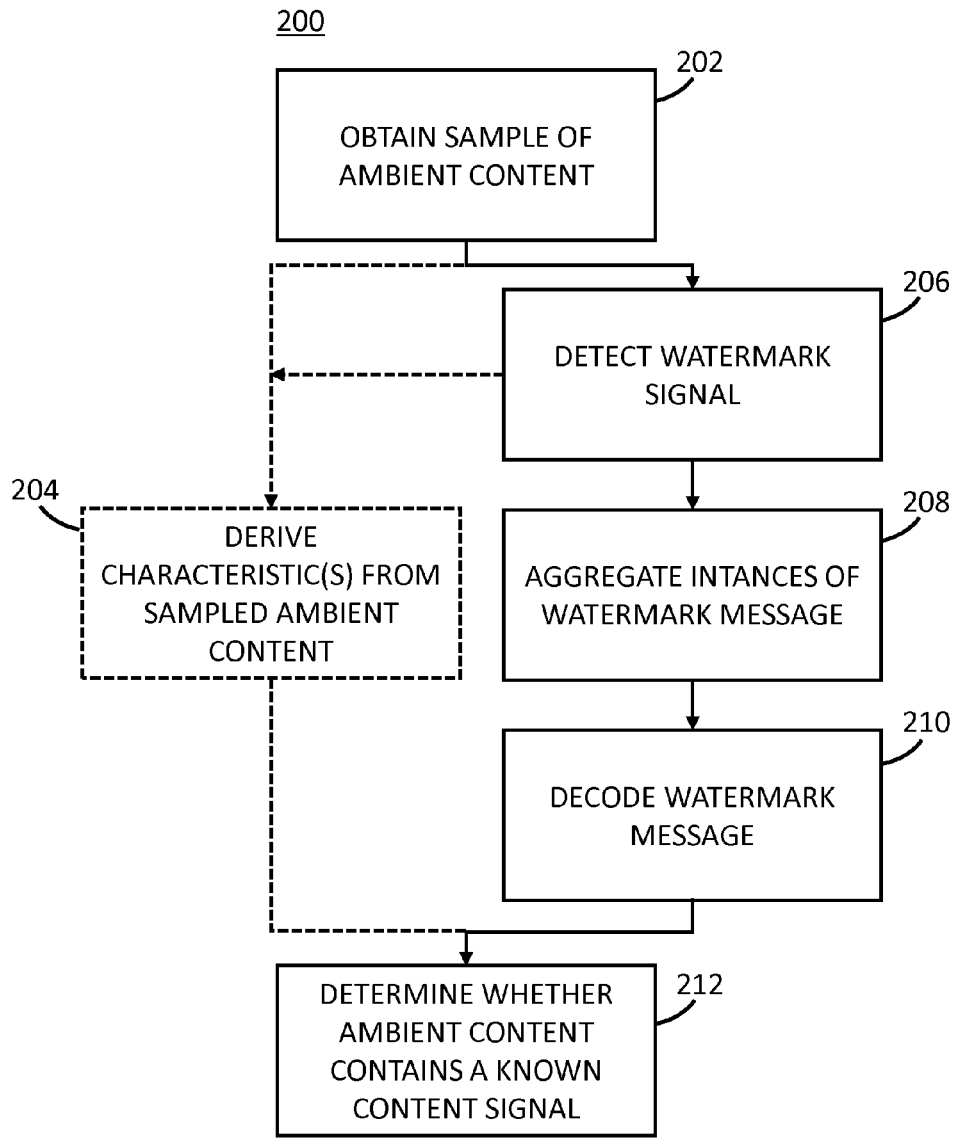
FIG. 2 illustrates a flow diagram generally describing a method for determining whether a known content signal is present within a sample of ambient content.

Referring to FIG. 2, one example of a method for determining whether ambient content includes a known or previously-identified content signal (also referred to as a "reference content signal"), such as method 200, includes first obtaining a sample of ambient content (202). As mentioned above, the present disclosure assumes it is possible that a watermarked content signal is present within the ambient environment from which the sampled ambient content was captured. In addition to watermarked content signals, the aural environment may also contain ambient noise (e.g., people talking, coffee grinders grinding, espresso machines brewing, doors slamming, sirens blaring, etc., acoustic reflections, reverberations, etc.). As used herein, "ambient noise" refers to any sound present within the same aural environment as a watermarked content signal when the ambient content is captured. Thus, the sampled ambient content may include ambient noise as well as a watermarked content signal.

Signal processing can be performed on the sensor signal(s) corresponding to the captured ambient content to compute, derive, identify or otherwise obtain a characteristic of the sampled ambient content (204) (also referred to herein as a "derived sample characteristic"). Signal processing can also be performed on the sensor signal(s) to detect the presence of a watermarked content signal (206). Upon detecting a watermarked content signal, such as a watermarked content signal as discussed above in Section II., multiple instances of the watermark message are aggregated (208). Aggregation improves the signal-to-noise ratio and provides improved robustness. Thereafter, the aggregated watermark message is decoded to extract the aforementioned signal data (210). Generally, the extracted signal data can be processed (e.g., decompressed, decoded, reconstructed, etc., depending upon the manner in which it was conveyed by the watermark message) or otherwise interpreted (e.g., as part of act (210)) to discern the characteristic(s) of the content signal embedded with the watermark message. If the aforementioned auxiliary data is also conveyed by the watermark message, then such auxiliary data may, optionally, be extracted at (210) as well.

Thereafter, a determination is made as to whether a known content signal is present within the sampled ambient content (212). As will be discussed in greater detail below, such a determination is made based upon one or more values (e.g., timepoint values, fingerprint values, etc.), each generated to represent one or more derived sample characteristics, one or more the characteristics represented by the extracted signal data (also referred to herein as "watermarked signal characteristics"), one or more characteristics derived from one or more derived sample or watermarked signal characteristics, or the like or any combination thereof (each generically referred to herein as a "query characteristic"). Thus, the determination at (212) is made based—at least in part—upon one or more query characteristics. According to embodiments herein, query characteristics can include (or be derived from) one or more watermarked signal characteristics associated with one content signal segment or with multiple content signal segments.

In the illustrated embodiment, the characteristic of the sampled ambient content computed, derived, identified or otherwise obtained at (204) is performed in parallel with one or more of the detecting, accumulating and decoding processes (206, 208, and 210). In other embodiments, however, any of these detecting, accumulating and decoding processes may be performed before or after the characteristic of the sampled ambient content is computed, derived, identified or otherwise obtained at (204). In one particular embodiment, the characteristic of the sampled ambient content is computed, derived, identified or otherwise obtained at (204) only if a watermarked content signal is detected at (206). In another particular embodiment, the characteristic of the sampled ambient content is computed, derived, identified or otherwise obtained at (204) only if a watermarked content signal, once detected and decoded, is determined to convey the aforementioned signal data. Exemplary techniques that may be used to perform these particular embodiments are described in the aforementioned U.S. Pat. No. 8,488,838, as well as in PCT Patent Application No. PCT/US14/72397 (published as WO 2015/100430), which is incorporated herein by reference in its entirety.

In addition, one or more signal processing operations used to compute, derive, identify or otherwise obtain characteristics of the sampled ambient content at (204) (or the results therefrom) may be used to facilitate detection of a watermarked content signal at (206). For example, the results of signal processing operations which perform frequency-domain transformation of the sampled ambient content can facilitate performance of acts (204) and (206). Depending upon the specific type of watermark embedded into the content signal, frequency-domain filtering techniques, when employed to perform act (204), might also be useful to facilitate performance of any of acts (206) and (208). Additional discussion of these and other techniques is described in the aforementioned U.S. Pat. No. 8,488,838 and U.S. Patent App. Pub. Nos. 2014/0108020 and 2014/0142958.

a. Deriving Characteristics of Sampled Ambient Content

Generally, the process(es) used to compute, derive, identify or otherwise obtain the characteristic of the sampled ambient content at (204) can be the same as, or otherwise be equivalent to or complement, the process(es) used to generate the signal data as discussed above in Section II.a. If a watermarked content signal is present, then the watermarked content signal will likely be present within the sampled ambient content, but may or may not be humanly perceptible depending upon the manner in which the watermarked content signal was rendered or captured, and depending upon the presence and nature of ambient noise when the sampled ambient content was captured. Moreover, depending upon the duration, intensity, frequency, etc., of any ambient noise included within the sampled ambient content, one or more of the characteristics derived from the sampled ambient content may be attributable to the ambient noise—not to the watermarked content signal.

In one embodiment, the type of characteristic (e.g., anchor, fingerprint, etc.) computed, derived, identified or otherwise obtained from the sampled ambient content at (204) is the same as the characteristic represented in the signal data generated at (102). In another embodiment, the type of characteristic computed, derived, identified or otherwise obtained from the sampled ambient content at (204) is different from the characteristic represented in the signal data generated at (102). For example, when a characteristic represented in the signal data includes an anchor, a characteristic computed, derived, identified or otherwise obtained from the sampled ambient content at (204) can include a fingerprint. In another example, when a characteristic represented in the signal data includes one type of fingerprint (e.g., a spectral slice fingerprint, multi-slice fingerprint, one or more LPC coefficients, one or more cepstral coefficients, one or more frequency components of at least one spectrogram peak, one or more linked spectrogram peaks, etc.), a characteristic computed, derived, identified or otherwise obtained from the sampled ambient content at (204) can include different type of fingerprint.

b. Extracting Signal Data from Watermarked Content Signals

The processes of detecting the presence of a watermarked content signal (206), aggregating instances of a watermark message (208) and decoding the aggregated watermark message to extract the signal data (210) may be performed using one or more suitable or desired techniques. In one embodiment, at least a portion of the sampled ambient content may be processed to estimate and, optionally, compensate certain distortions (e.g., time scale distortions involving linear and pitch invariant time scaling of the ambient content. These processes may be performed by one or more devices such as a programmed computer, special purpose digital logic, or the like or any combination thereof. Exemplary techniques that may be used to perform these processes are described in the aforementioned U.S. Pat. Nos. 5,862,260, 6,614,914, 6,674,876, 7,020,304, 7,412,072, 7,424,131, 8,488,838, and 8,660,581, U.S. Patent App. Pub. Nos. 2012/0214544, 2014/0108020, 2014/0142958, 2015/0016661, and PCT Application No. PCT/US14/72397, which are each hereby incorporated herein by reference in its entirety.

c. Identifying Content Signals in Sampled Ambient Content

To determine whether a known content signal is present within the sampled ambient content at (212), a database or other data repository, typically containing values (e.g., timepoint values, fingerprint values, etc., each also generically referred to as a "reference value") representing a set of characteristics (each also referred to herein as a "reference characteristic") corresponding to one or more known content signals (each also generically referred to as a "reference content signal"), is first provided. Timepoint values, fingerprint values, etc. (each also generically referred to as a "query value"), representing any query characteristics obtained as a result of performing any of acts (204), (206), (208) or (210) are then used in the match-finding process at (212). Some example embodiments of query characteristics are described in more detail below.

The match-finding process then queries the data repository, to retrieve one or more reference values that sufficiently match, or otherwise have some predetermined relationship with, one or more query values. If a sufficient match, or other predetermined relationship, exists between one or more query values and one or more reference values for a particular reference content signal, then a reference content signal is considered to be present within the sampled ambient content. It will be appreciated that any suitable or desirable technique may be used to determine whether a query value sufficiently matches (or has some other predetermined relationship with) a reference value. Exemplary techniques that may be used to make such a determination are described in aforementioned U.S. Pat. Nos. 5,918,223, 6,963,975, 6,990,453, 7,013,301, 7,167,857, 7,277,766, 7,590,035, 7,749,052, 7,421,305, 7,698,254, 7,788,279, 7,853,664, 7,907,211, 8,020,000, 8,071,869, 8,326,584, 8,660,267, 8,686,271, 8,688,253, and 8,700,407 and U.S. Patent App. Pub. Nos. 2008/0167862 and 2013/0160038, which are each incorporated herein by reference in its entirety.

The data repository may also include any auxiliary data, such as that described above, that may be associated with each reference content signal. Upon determining that the watermarked content signal matches a reference content signal, one or more items of the stored auxiliary data may be returned to the capture device, to a device separate from the capture device that may or may not be communicatively coupled thereto via one or more wired or wireless links as discussed above, or the like or any combination thereof.

d. Additional Remarks

Generally, the acts of computing, deriving, identifying or otherwise obtaining a characteristic of the sampled ambient content at (204), detecting the presence of a watermarked content signal at (206), aggregating watermark message instances at (208), and decoding the watermark message at (210) are performed by one or more processors associated with the capture device. Thus, the act of obtaining the sampled ambient content at (202) can occur at the capture device. It will be appreciated however, that any of these acts (202), (204), (206), (208) or (210) may be performed by (or occur at) one or more processors associated with one or more devices that are different from the capture device, but that are communicatively coupled to the capture device via one or more suitable or desired wired links or wireless links as discussed above. Examples of such other devices include any of the aforementioned devices, a server remote from the capture device (e.g., cloud storage server associated with the capture device, with the user of the capture device, etc., a server associated with an entity administering a content recognition service, or the like or any combination thereof).

Generally, the act of finding a match at (212) is performed by one or more processors associated with one or more devices (which may include any type of device, such as those described above) that are different from the device(s) at which any of the acts (202), (204), (206), (208) or (210) were performed. It will be appreciated however, that the act of finding a match at (212) may be at least partially performed by one or more processors associated with one or more of the same devices at which any of the acts (202), (204), (206), (208) or (210) were performed.

Further, the act of generating a value representative of a query characteristic is performed by one or more processors associated with the capture device. In one embodiment, the act of generating a value representative of a query characteristic is performed by the same processor(s) that performed any of the acts (202), (204), (206), (208), (210) or (212). Further still, it will be appreciated that any of the acts described herein (e.g., including any of the acts (202), (204), (206), (208), (210) or (212)) may be performed by one or more processors associated with the same device or with two or more different devices communicatively coupled to one another via one or more suitable or desired wired links or wireless links as discussed above.

IV. More on Generating Signal Data a. Representing Content Signal Characteristics in Signal Data Generally, the signal data generated for a particular content signal includes many sets of signal data, wherein each set of signal data is generated from a corresponding segment of the content signal. Any two segments of a content signal can overlap one another, adjoin one another (i.e., not overlap), or be adjacent to one another (i.e., not adjoin one another). As used herein, a content signal "segment" is typically defined within a time dimension of the content signal. Generally, the duration of any content signal segment can be in a range from 1 second to 10 seconds (e.g., from 1 second to 3 seconds). It will be appreciated, however, that the duration of the content signal segment can be less than 1 second, or more than 10 seconds. These concepts may be more readily understood by reference to an example embodiment described in connection with FIG. 3.

Figure 3:
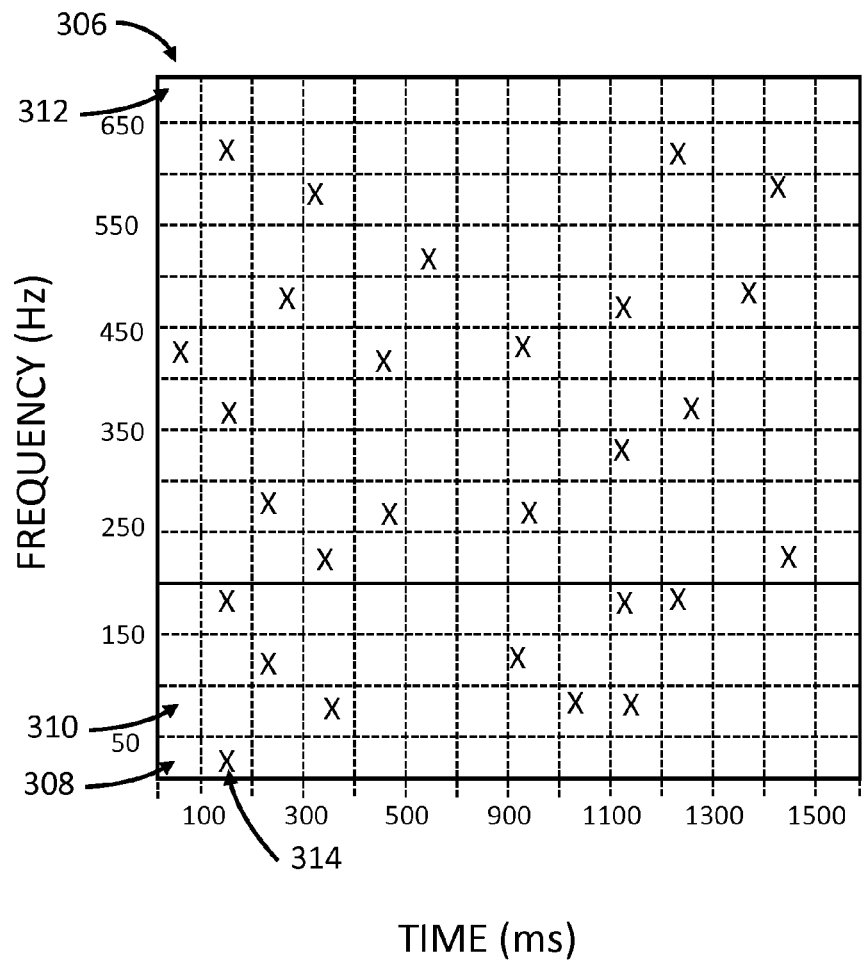
FIG. 3 illustrates, as an example of a multidimensional function, a spectrogram for a segment of a content signal, with a set of salient features or characteristics indicated.
Figure 3:
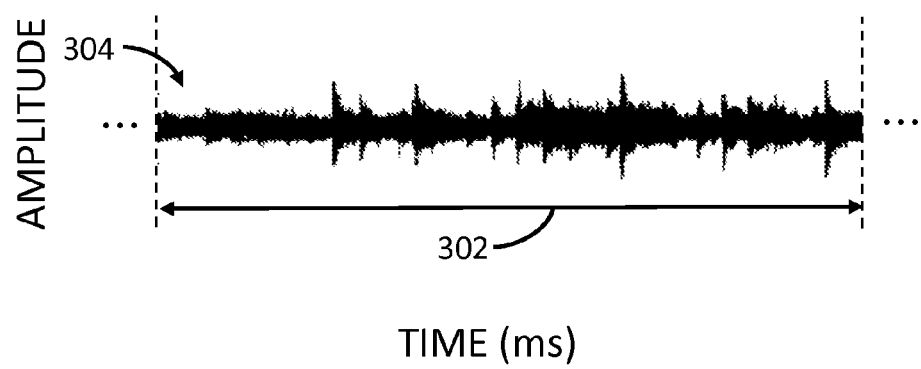

Referring to FIG. 3, signal data is generated from a segment (e.g., segment 302) of a content signal (e.g., content signal 304) by computing, as the multidimensional function of a content signal, a spectrogram (e.g., spectrogram 306) of the content signal. In the illustrated example, the content signal segment 302 has a duration of about 1600 ms. As will be appreciated, a spectrogram is a time-frequency analysis of a sound recording in which windowed and overlapped frames of sound samples are spectrally analyzed, typically using a Fast Fourier Transform (FFT). Spectrograms are typically plotted, as shown in FIG. 3, as a function with time on the horizontal axis, and frequency on the vertical axis. Each sequential FFT frame is stacked vertically at corresponding evenly-spaced intervals along the time axis (also known as "timeslices"). Although not shown, the spectrogram 306 would typically depict a plot of the energy density of the content signal segment 302 at each set of time-frequency coordinates (also referred to as a "time-frequency bin"), where darker areas on the plot can represent higher energy density.

Once the spectrogram 306 is created, one or more characteristics (e.g., anchors, fingerprints, etc.) are then computed, derived, identified or otherwise obtained from the salient features or points (e.g., local maxima) represented therein. For example, spectral peaks, once computed, derived, identified or otherwise obtained, can be represented by an "X", where the time coordinate associated with an "X" can be considered an anchor and the frequency coordinate associated with the "X" can be used to compute a corresponding fingerprint. In the illustrated spectrogram 306, the characteristics are extracted by performing a local maximum search over patches of the time-frequency plane, rather than over an entire timeslice. For an exemplary illustration of energy density depicted in a spectrogram, and for a discussion of various techniques used to extract characteristics therefrom, see, e.g., U.S. Pat. No. 6,990,453.

As alternative to the representation shown in FIG. 3, the extracted characteristics can be represented in a data structure, wherein each index in the data structure corresponds to a sampled window on the spectrogram 306. Any two sampled windows of the spectrogram 306 can overlap one another, adjoin one another (i.e., not overlap), or be adjacent to one another (i.e., not adjoin one another). The sample window may, in the time dimension, be so narrow as to correspond to a single point in time, or may span a duration in a range of 50 ms to 500 ms (or less than 50 ms or greater than 500 ms). Likewise, the sample window may, in the non-time dimension (e.g., the frequency dimension), be so narrow as to correspond to a single frequency, or may span a range of frequencies (e.g., a frequency band having a width of in a range of 50 Hz to 300 Hz, etc., or less than 50 Hz or greater than 300 Hz). In one embodiment, the presence of a characteristic, "X", within a sample window on the spectrogram 306 can be represented within a corresponding index of the data structure as a "1," otherwise the index would contain a "0". In another embodiment, an index of the data structure can contain a number indicating the number of characteristics within a corresponding sample window on the spectrogram 306. These concepts may be more readily understood by reference to an examined embodiment described in connection with FIG. 4.

Figure 4:
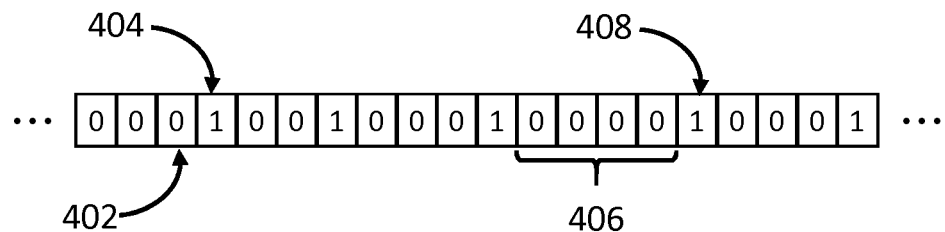
FIG. 4 illustrates a portion of a data structure according to one embodiment, said data structure corresponding to the at least some of the characteristics illustrated in FIG. 3.
Figure 5:
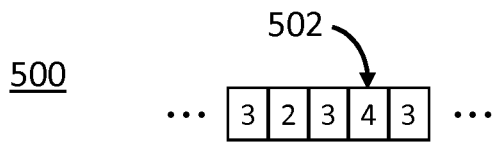
FIG. 5 illustrates a data structure obtained by compressing the data structure illustrated in FIG. 4 according to one example embodiment.
Figure 6:
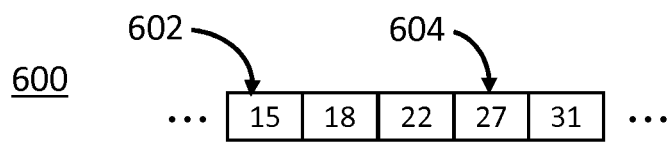
FIG. 6 illustrates a data structure obtained by compressing the data structure illustrated in FIG. 4 according to another example embodiment.

Referring to FIG. 4, the spectrogram 306 can be represented as data structure 400 400, wherein each index in the data structure 400 corresponds to a sample window on the spectrogram 306, and wherein each sample window has a duration of 100 ms (or thereabout) and a frequency band of 50 Hz (or thereabout). Sequential blocks of indices in the data structure 400 thus correspond to horizontally-arrayed columns of vertically-stacked sample windows such that, within each index block, the first index in the data structure 400 corresponds to the sample window having the lowest frequency band (e.g., the frequency band spanning 0-50 Hz, as shown in FIG. 3) and the last index in the data structure 400 corresponds to the sample window having the highest frequency band (e.g., the frequency band spanning 650-700 Hz, as shown in FIG. 3). For example, the first index in one index block of the data structure 400 may correspond to the sample window 308, the next to sample window 310, etc., and the last may correspond to the sample window 312. The first index in the next sequential index block may correspond to sample window 314, and so on. Thus, the "0" located in index 402 of data structure 400 may represent the absence of an "X" in sample window 312, the "1" located in index 404 of data structure 400 may represent the "X" in sample window 314, and so on. Notwithstanding the above, it will be appreciated that the data structure 400 can be composed using any suitable or desired technique. Typically, the ratio of indicies in the data structure 400 containing 1's to those containing 0's will be very low. Therefore, the data structure 400 can be characterized as, what is known in the art, as a "sparse" signal.

While it is possible to convey the data structure 400 within the watermark message, it may be desirable to compress the data structure 400 using one or more suitable or desired techniques to account for constraints relating to the size of the content signal, the capacity of the watermark message, the desired robustness of the watermark signal, or the like or any combination thereof. In one embodiment, the data structure 400 may be compressed by employing a zero suppression encoding technique. One zero suppression encoding technique can be applied by generating a data structure containing a series of elements, wherein each element corresponds to the number of data structure indices containing a "0" which immediately preceding a data structure index having a non-zero element. (Two sequential data structure indices having non-zero elements can be represented as a "0" in the data structure). For example, and with reference to FIGS. 4 and 5, the string of four sequential 0's (indicated at 406) preceding data structure index 408 can be represented as a "4" at element 502 of the data structure 500 shown in FIG. 5. Taken as signal data, this data structure 500 can then be further encoded using any suitable or desired technique to construct the watermark message for embedding into the content signal.

In another embodiment, the data structure 400 may be compressed by encoding the position of each data structure index in the sparse representation that contains a non-zero element. For example, and with reference to FIGS. 4 and 6, the position of the 1's at data structure indices 404 and 408 may be represented within data structure 600 as "15" and "27" respectively (as respectively denoted by 602 and 604 in FIG. 6). Taken as signal data, this data structure 600 can then be further encoded using any suitable or desired technique to construct the watermark message for embedding into the content signal.

Figure 7:
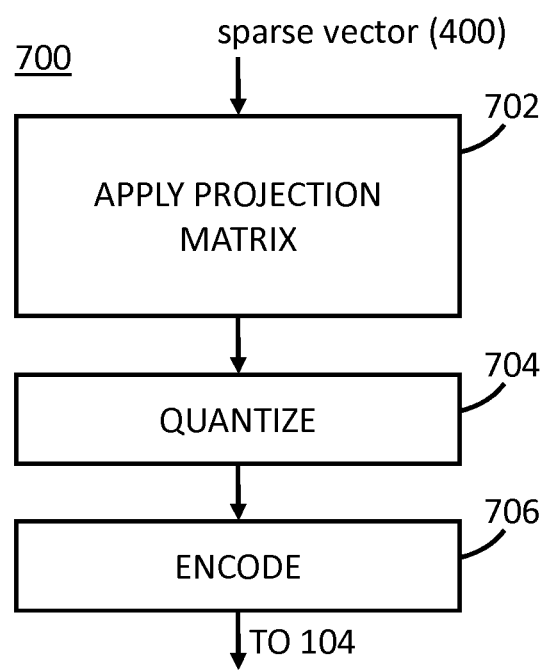
FIG. 7 illustrates a flow diagram describing another example method for encoding the data structure illustrated in FIG. 4.

In yet another embodiment, and with reference to FIG. 7, the data structure 400 may be treated as a sparse vector and a compressive sensing method, such method 700, may be employed. For example, the sparse vector (e.g., data structure 400) may be projected onto a sensing matrix to obtain a set projected measurements such as a set of real numbers, $\mathbb{R}$, , (e.g., between 2 and 4 real numbers). Each of the real numbers is then quantized (704) and then encoded (706) using any suitable or desired technique to construct the watermark message for embedding into the content signal. For more information on compressive sensing techniques, see, e.g., U.S. Pat. Nos. 7,271,747, 7,511,643, 7,916,052, 8,199,244 and 8,648,742, each of which is incorporated herein by reference in its entirety.

According to the examples given above, the data structures 400, 500 and 600 can essentially encode (with varying levels of resolution, depending upon the sample window size in the time and non-time dimensions) the coordinate set that locates one or more characteristics represented within a multidimensional function computed for a content signal segment. However, sample windows used to generate the data structures may, in the time dimension, span a duration equal to the entire range of the content signal segment. In this case, a data structure can be generated to encode the location of one or more characteristics only in one or more non-time dimensions of the multidimensional function (e.g., the frequency dimension of spectrogram 306). Likewise, sample windows used to generate the data structures may, in a non-time dimension (e.g., the frequency dimension of spectrogram 306), span the entire frequency range of the spectrogram 306. In this case, a data structure can be generated to encode the location of one or more characteristics in only the time dimension of the multidimensional function.

Generally, once a set of signal data has been generated for a content signal segment, a watermark message conveying that signal data is constructed (e.g., as described above with respect to (104), and multiple instances of the watermark message are embedded only into that content signal segment (e.g., as described above with respect to (106). For example, a watermark message conveying signal data corresponding to content signal segment 302 is constructed and multiple instances of that message are embedded only into content signal segment 302. In another embodiment, however, one or more instances of the watermark message conveying signal data corresponding to content signal segment 302 may be embedded into one or more other segments of the content signal (or into the entirety of the content signal). Thus, characteristics represented by the signal data may or may not correspond to characteristics of the portion of the content signal into which the signal data was embedded.

b. Characteristic Composition of the Signal Data

In one embodiment, a set of signal data generated from a content signal segment can represent all of the characteristics that can be computed, derived, identified or otherwise obtained from the content signal segment. In another embodiment however, a set of signal data generated from a content signal segment represents less than all of the characteristics that may be computed, derived, identified or otherwise obtained from the content signal segment. Thus, a set of signal data generated from a content signal segment can represent a single characteristic or some (but not all) of the characteristics that may be computed, derived, identified or otherwise obtained from the content signal segment.

In one embodiment, two or more different sets of signal data (i.e., one set representing one or more characteristics that are different from those represented by the other set) can be generated from the same content signal segment. The different sets of signal data can be generated by (or on behalf of) the same entity or can be generated by (or on behalf of) different entities. In either case, the different sets of signal data can be generated at the same time or at different times. Notwithstanding the above, it will be appreciated that the same set of signal data can be generated from the same content signal segment at different times, by entities located in different geographical areas, and the like. In some cases, identical sets of signal data can be generated from content signal segments that are different from one another, but that are characterized by differences that are insignificant or of a type that is not relevant to act (204).

To increase the likelihood that a plurality of different sets of signal data can be reliably generated from the same content signal segment, a determination as to the number or type of characteristics to be represented by a set of signal data can be made deterministically, probabilistically, or the any combination thereof. For example, a content signal segment can be analyzed to compute, derive, identify or otherwise obtain characteristics thereof that: (a) exhibit a relatively high robustness to ambient noise (e.g., characteristics that tend to be accurately or reliably identified in the presence of ambient noise), (b) that exhibit a relatively low robustness to ambient noise, (c) are present at a location within the content signal (e.g., as discerned within a time dimension, a non-time dimension, etc., of the content signal segment), (d) are present at a location within the content signal segment corresponding to a particular semantically-identifiable portion thereof (e.g., a chorus or a verse of a song, the opening or closing credits of a movie, etc.), or the like or any combination thereof. Thereafter, two sets of signal data, each representing a different set of such characteristics is generated as discussed above. In one embodiment, the different sets may have the same number or different numbers of characteristics of the content signal segment, and may have one or more characteristics in common or may have no characteristics in common.

In another example, the entire content signal segment can be processed—irrespective of the analysis described above—to compute, derive, identify or otherwise obtain characteristics thereof, and those characteristics can thereafter be randomly selected or identified to be represented by the signal data. Alternatively, random portions of a content signal segment can be processed to compute, derive, identify or otherwise obtain characteristics thereof, and those characteristics can then be represented by the signal data. In another example, the selection of characteristics to be represented by the signal data (or of portions of the content signal segment from which to compute, derive, identify or otherwise obtain characteristics) can be pseudo-randomly selected (e.g., based upon analysis of the content signal as described above, based upon a pseudo-random number generator, or the like or any combination thereof).

In one embodiment, content signals within a set may contain one or more segments that are identical (or, at least, perceptually indistinguishable from one another), but also contain one or more segments that are unique (or, at least, perceptually distinguishable from other segments). An example of such content signals may include a set of radio commercials advertising a sale for a particular discount mattress business with multiple locations in different cities, counties, states, etc. Each radio commercial may be the identical, except for the last 10 seconds when the location of a particular store for the business is identified. Another example of such content signals may include one or more source songs and another song or mix that contains a sample of a source song. In this embodiment, the set of content signals can be analyzed to discern, for each non-unique (or, at least, perceptually indistinguishable) segment of a content signal, one or more characteristics that is uniquely associated with that content signal.

V. More on Query Characteristics

In one embodiment, a query characteristic can include a derived sample characteristic that has been modified based on one or more watermarked signal characteristics (this type of characteristic is also referred to herein as a "modified derived sample characteristic"). For example, a derived sample characteristic of the sampled ambient content can include a set of anchors (which may include anchors attributable to ambient noise present within the aural environment when the sample of ambient content was captured), and the watermarked signal characteristic can include one or more anchors of one or more content signal segments present within the sampled ambient content. The derived sample characteristic can be modified by removing, using any suitable denoising or filtering process, any anchor included therein that does not sufficiently correspond to an anchor included in the watermarked signal characteristic. Thereafter, values (e.g., timepoints) corresponding to any anchors remaining in the modified derived sample characteristic(s) can be submitted as a query to the match-finding process (212). In related implementation, any anchor included therein which does not sufficiently correspond to an anchor included in the watermarked signal characteristic can be flagged and be included in the query to the match-finding process (212), but flagged anchors will be weighted less than anchors that are not flagged.

Figure 8:
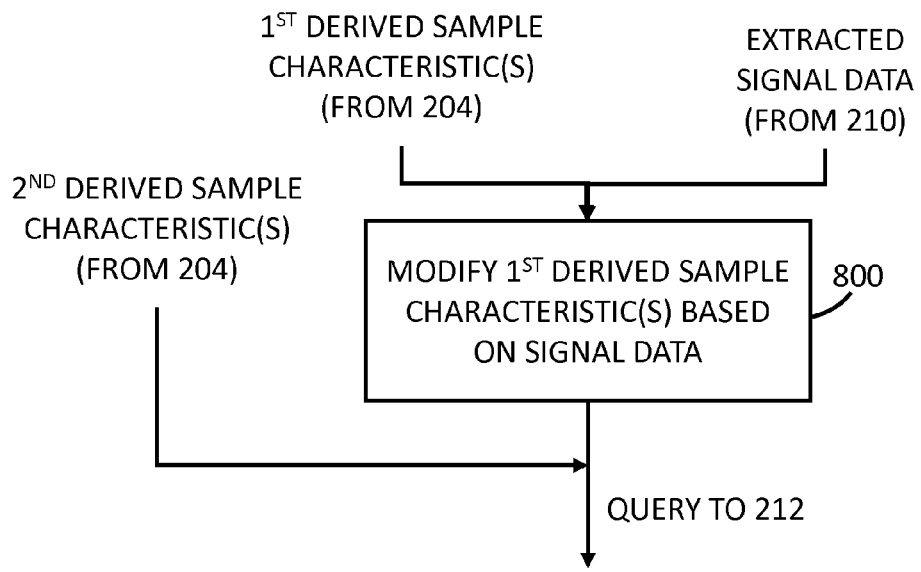
FIG. 8 illustrates a flow diagram describing one example method for generating a query characteristic.

In another embodiment, a query characteristic can include a modified derived sample characteristic (e.g., as described above), and a derived sample characteristic that has not been modified based on a watermarked signal characteristic. For example, and with reference to FIG. 8, a set of derived sample characteristics can include one or more first derived sample characteristics (e.g., one or more anchors) and one or more second derived sample characteristics (e.g., one or more fingerprints). The first derived sample characteristic(s) can be modified (at 800) based upon the watermarked signal characteristic (e.g., including one or more anchors of one or more content signal segments present within the sampled ambient content) in the manner as discussed above to generate one or more modified derived sample characteristics. Thereafter, any values representing the modified derived sample characteristics, together with any values representing the second derived sample characteristic(s), can be submitted as a query to the match-finding process (212). In another embodiment, a query characteristic can include a watermarked signal characteristic. For example, a watermarked signal characteristic can include the location of a characteristic (e.g., an anchor) in a time dimension, a non-time dimension (e.g., a frequency dimension), or the like or any combination thereof. Thereafter, any values representing the watermarked signal characteristic can be submitted as a query to the match-finding process (212). In an optional implementation, any value(s) representing one or more derived sample characteristics can also be included in the query to the match-finding process (212), and such values may be given more or less weight (or the same weight) during match-finding process (212) as value(s) representing the watermarked signal characteristic.

Figure 9:
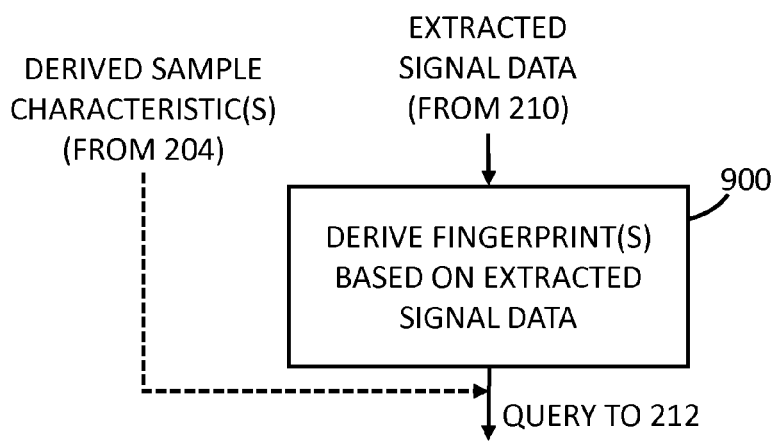
FIG. 9 illustrates a flow diagram describing another example method for generating a query characteristic.

In yet another embodiment, a query characteristic can include a characteristic that is computed, derived, identified or otherwise obtained by reference to a watermarked signal characteristic as discussed above (this type of characteristic is also referred to herein as a "derived signal characteristic"). For example, and with reference to FIG. 9, a watermarked signal characteristic can include the location of a set of characteristics (e.g., an anchor) in a time dimension, a non-time dimension (e.g., a frequency dimension), or the like or any combination thereof, and one or more fingerprints can be derived (900) from the set of anchors. In this case, the derived fingerprint can correspond to the relative location of two or more anchors in the set (e.g., in a time dimension, a non-time dimension such as a frequency dimension, or the like or any combination thereof). Thereafter, any value(s) representing the derived signal characteristic can be submitted as a query to the match-finding process (212). In this embodiment, the aforementioned sample window size used to generate the data structure from which the watermarked signal characteristic is interpreted will typically be smaller (e.g., in one or more or all dimensions of the content signal segment) than the sample window size used to generate the data structure from which the watermarked signal characteristic is interpreted in the embodiments involving generation of a modified derived sample characteristic. In an optional implementation, any value(s) representing one or more derived sample characteristics can also be included in the query to the match-finding process (212), and such values may be given more or less weight (or the same weight) during match-finding process (212) as value(s) representing the derived signal characteristic.

By deriving, computing, identifying, or otherwise obtaining query characteristics as described above, the match-finding process (212) can be performed without relying solely upon derived sample characteristics, which might otherwise interfere with or prevent accurate and reliable identification of reference content signals in the sampled ambient content.

VI. Estimating Watermark Distortion to Facilitate Content Recognition

As mentioned above, the manner in which a content signal is rendered within an aural environment, or sampled within the aural environment, can introduce temporal distortion (e.g., time scaling) in the sampled ambient content. If content signals within the sampled ambient include an excessive amount of time scaling, then the match-finding process (212) may be ineffective to accurately and reliably determine whether the sampled ambient content includes a reference content signal. To increase the robustness of the match-finding process (212) to time scaling distortion, the sampled ambient content may be processed (e.g., upon detecting the presence of a watermark at (206) in FIG. 2) to estimate whether and how the watermarked signal is distorted.

In this case, a watermarked content signal may consist of a content signal having a watermark message at least substantially imperceptibly embedded, as exemplarily discussed above. In another embodiment, however, the watermark signal may be embedded so as to be perceptible. In yet another embodiment, the watermark message may convey a synchronization signal (also known as an "orientation signal") in addition, or alternatively, to the signal data. In this embodiment, the sampled ambient content can be processed to determine whether and how the synchronization signal is distorted. Examples of techniques that may be used to estimate the presence and degree of distortion in a watermark signal (or component thereof) are described in aforementioned U.S. Pat. No. 7,020,304 and U.S. Patent App. Pub. Nos. 2014/0108020 and 2014/0142958, as well as in U.S. Pat. No. 6,483,927, which is incorporated herein by reference in its entirety.

Based on the estimated distortion of a watermarked content signal included in the sampled ambient content, a match-finding process, which may or may not be performed as discussed above with respect to match-finding process (212), is performed to determine whether sampled ambient content includes a reference content signal. For example, in one embodiment, a derived sample characteristic that would otherwise be submitted to a match-finding process can first be modified to compensate for the estimated distortion and the derived sample characteristic, so-modified, may then be submitted to the match-finding process. In another example embodiment, correspondences generated between one or more of the derived sample characteristics and corresponding reference characteristics can be modified based on the estimated distortion and a determination may then be made, based on those modified correspondences, as to whether the corresponding characteristics have a predetermined relationship (e.g., as discussed above). In yet another example embodiment, the manner in which correspondences are generated between one or more of the derived sample characteristics and corresponding reference characteristics can depend upon the estimated distortion.

VII. Exemplary Use Cases

In addition to facilitating content recognition, signal data can be generated to facilitate the generation of customized responses upon finding a match (e.g., at (212)) for the same reference content signal, depending upon whether the sampled ambient content contains a content signal that matches a reference content signal and that is watermarked as discussed above (or depending upon which characteristic(s) is(are) represented by signal data conveyed in the watermark).

For example, suppose one entity (e.g., a coffee company such as STARBUCKS) is aware that its customers employ well-known smartphone-supported audio content recognition (ACR) technology to access a proprietary $3^{rd}$ party data repository (e.g., containing only bibliographic information relevant to a set reference content signals) administered by the $3^{rd}$ party (e.g., SHAZAM, AMAZON). However, that entity may be desirous of linking its customers to its own auxiliary data (e.g., including in-store promotions, web links to its website, an instruction to launch an in-store payment app supported by a customer's smartphone, etc., which may be in addition to the standard bibliographic information administered by the $3^{rd}$ party) whenever its customers perform ACR for a particular song in its playlist. By performing the acts, methods and processes described above, such entity may (or may request the $3^{rd}$ party to) compute, derive, identify or otherwise obtain a set of characteristics for the particular song, or associate that set of characteristics with the entity's auxiliary data. Then the entity's auxiliary data, set of characteristics, and an optional identifier associated with the entity, may be stored at the $3^{rd}$ party's data repository (e.g., in association with the reference content signal that corresponds to the particular song). Before or after the auxiliary data is generated, the entity may embed the generated signal data within the particular song, thereby generating a watermarked version of the particular song. Further, the watermarked version of the particular song may be rendered before or after the entity's auxiliary data, set of characteristics, etc., is stored at the $3^{rd}$ party's data repository. However if, after the entity's auxiliary data and set of characteristics represented by the signal data has been stored at the $3^{rd}$ party's data repository, the $3^{rd}$ party obtains query characteristics that sufficiently match or otherwise correspond to the entity's set of characteristics, then the $3^{rd}$ party can return the entity's auxiliary data.

As noted above, different sets of characteristics can be computed, derived, identified or otherwise obtained for the same content signal. Thus, different entities can request the same $3^{rd}$ party to return different auxiliary data upon detecting different sets of characteristics represented by signal data embedded within the content signals that they render.

Further, in addition to enabling ACR services to return different auxiliary data upon identifying differently-watermarked instances of the same content signal, the watermark detection processes described herein (e.g., associated with acts (206), (208) and (210)) can be employed to attempt to identify reference content signals within sampled ambient content whenever conventional content recognition techniques cannot find a match.

VIII. Example Combinations

The following combinations are provided by way of example. Of course, these combinations are not intended to be limiting as many other, related and different combinations are apparent from the above detailed description and accompanying drawings.

A1. A method, comprising:
generating a first set of signal data representing a characteristic of a first segment of a content signal, wherein the content signal comprises a plurality of segments;
generating a first watermark message conveying the first set of signal data; and
embedding the first watermark message into the first segment of the content signal, wherein the first watermark message is substantially imperceptible in the content signal.

A2. The method of A1, wherein the characteristic of the first segment is not present within a second segment of the content signal.

A3. The method of any of A1 to A2, further comprising:
analyzing the first segment of the content signal; and
identifying the characteristic of the first segment based upon the analyzing.

A4. The method of A3, wherein the act of analyzing comprises analyzing a dimension of the first segment of the content signal.

A5. The method of A4, wherein the dimension includes a time dimension.

A6. The method of any of A4 to A5, wherein the dimension includes a non-time dimension.

A7. The method of A6, wherein the non-time dimension includes a frequency dimension.

A8. The method of any of A3 to A7, wherein the act of analyzing comprises computing a multidimensional function from the first segment of the content signal.

A9. The method of A8, wherein at least one of the dimensions of the multidimensional function is a time dimension.

A10. The method of any of A8 to A9, wherein at least one of the dimensions of the multidimensional function is a non-time dimension.

A11. The method of A10, wherein the non-time dimension of the multidimensional function includes a frequency dimension.

A12. The method of any of A1 to A11, wherein the characteristic includes an anchor within the first segment, wherein the anchor represents a location in time dimension of the first segment corresponding to a fingerprint of the first segment.

A13. The method of A12, wherein the anchor is computed from a salient point of the multidimensional function.

A14. The method of A13, wherein the salient point includes at least one selected from the group consisting of a local maxima, a local minima, and a zero crossing of said multidimensional function in the time dimension of the first segment.

A15. The method of any of A1 to A14, wherein the first segment of the content signal is characterized by a plurality of characteristics, and wherein the first set of signal data represents more than one of the plurality of characteristics of the first segment.

A16. The method of A15, wherein the first set of signal data represents less than all of the plurality of characteristics of the first segment of the content signal.

A17. The method of any of A1 to A16, wherein the act of generating the first set of signal data comprises:
   generating a sparse representation of the first segment of the content signal; and
   compressing the sparse representation.

A18. The method of A17, wherein the act of compressing comprises applying a zero suppression encoding technique to the sparse representation.

A19. The method of A17, wherein the act of compressing comprises encoding an index position of each non-zero element in the sparse representation.

A20. The method of A17, wherein the act of compressing comprises:
   projecting the sparse representation onto a compressive sensing matrix, thereby generating a projected measurement; and
   quantizing the projected measurement.

A21. The method of any of A1 to A20, wherein embedding the first watermark message into the first segment of the content signal comprises embedding multiple instances of the first watermark message into the first segment of the content signal.

A22. The method of any of A2 to A21, further comprising embedding the first watermark message into the second segment of the content signal.

A23. The method of any of A2 to A22, further comprising:
   generating a second set of signal data representing a characteristic of the second segment of the content signal;
   generating a second watermark message conveying the second set of signal data; and
   embedding the second watermark message into the second segment of the content signal.

A24. The method of A23, further comprising embedding the second watermark message into the second segment of the content signal such that the second watermark message is substantially imperceptible in the content signal.

A25. The method of any of A23 to A24, wherein embedding the second watermark message into the second segment of the content signal comprises embedding multiple instances of the second watermark message into the second segment of the content signal.

A26. The method of any of A1 to A25, further comprising outputting the content signal having the first watermark message embedded therein.

A27. The method of A26, wherein outputting comprises broadcasting the watermarked content signal.

A28. The method of any of A26 to A27, wherein outputting comprises streaming the watermarked content signal.

A29. The method of any of A26 to A28, wherein outputting comprises rendering the watermarked content signal.

A30. The method of any of A1 to A29, further comprising storing the first watermark message.

A31. The method of A30, wherein storing the first watermark message comprises storing the watermarked content signal.

A32. The method of any of A1 to A31, further comprising generating auxiliary data.

A33. The method of A32, wherein the auxiliary data is generated after rendering the watermarked content signal.

A34. The method of any of A30 to A33, further comprising storing auxiliary data in association with the first watermark message.

A35. The method of A34, wherein the auxiliary data is stored in association with the first watermark message after rendering the watermarked content signal.

A36. The method of any of A1 to A35, further comprising generating the first watermark message such that auxiliary data is conveyed thereby.

A37. The method of any of A32 to A36, wherein the auxiliary data is independent of salient features of the content signal.

A38. The method of any of A32 to A37, wherein the auxiliary data describes an identity of an entity that embedded the first watermark message.

A39. The method of any of A32 to A38, wherein the auxiliary data describes an identity of an entity on whose behalf the first watermark message was embedded.

A40. The method of any of A32 to A39, wherein the auxiliary data describes a location corresponding to a venue where the first watermark message was embedded into the content signal.

A41. The method of any of A32 to A40, wherein the auxiliary data describes a location corresponding to a venue where the watermarked content signal was rendered.

A42. The method of any of A32 to A41, wherein the auxiliary data describes an identity of the anchor represented by the signal data.

A43. The method of any of A32 to A42, wherein the auxiliary data describes a location of the anchor represented by the signal data.

A44. The method of any of A32 to A43, wherein the auxiliary data describes a time when the first watermark message was embedded into the content signal.

A45. The method of any of A32 to A44, wherein the auxiliary data describes a time when the watermarked content signal was rendered.

A46. The method of any of A1 to A45, wherein the content signal is an audio content signal representing sound.

B1. A method, comprising:
   generating first signal data representing at least a portion of a first set of salient features of a segment of a first content signal;
   generating second signal data representing at least a portion of a second set of salient features of a segment of a second content signal, wherein the second content signal is different from the first content signal and wherein a salient feature in the second set of salient features is different from a salient feature in the first set of salient features;
   producing a first watermarked content signal by embedding a first watermark message conveying the first signal data into the first content signal; and
   producing a second watermarked content signal by embedding a second watermark message conveying the second signal data into the second content signal.

B2. The method of B1, wherein a salient feature in the first set of salient features is the same as a salient feature the second set of salient features.

C1. A method, comprising:
   generating first signal data representing a first set of salient features of a segment of a content signal, wherein the content signal comprises a plurality of segments;
   generating second signal data representing a second set of salient features of the segment of the content signal, wherein a salient feature in the second set of salient features is different from a salient feature in the first set of salient features;

producing a first watermarked content signal by embedding a first watermark message conveying the first signal data into a first instance of the content signal; and producing a second watermarked content signal by embedding a second watermark message conveying the second signal data into a second instance of the content signal.

C2. The method of C1, wherein a salient feature in the first set of salient features is the same as a salient feature the second set of salient features.

D1. A method, comprising:
generating first signal data representing at least a portion of a first set of salient features of a segment of a first content signal;
generating second signal data representing at least a portion of a second set of salient features of a segment of a second content signal, wherein the second content signal is different from the first content signal and wherein a salient feature in the second set of salient features is the same as a salient feature in the first set of salient features;
producing a first watermarked content signal by embedding a first watermark message conveying the first signal data into the first content signal; and
producing a second watermarked content signal by embedding a second watermark message conveying the second signal data into the second content signal.

E1. A method, comprising:
generating first signal data representing a first set of salient features of a segment of a content signal, wherein the content signal comprises a plurality of segments;
generating second signal data representing a second set of salient features of the segment of the content signal, wherein a salient feature in the second set of salient features is the same as a salient feature in the first set of salient features;
producing a first watermarked content signal by embedding a first watermark message conveying the first signal data into a first instance of the content signal; and
producing a second watermarked content signal by embedding a second watermark message conveying the second signal data into a second instance of the content signal.

E2. The method of E1, wherein the act of producing the first watermarked content signal comprises embedding the first watermark message into the first content signal or the first instance of the content signal such that the first watermark message is substantially imperceptible therein.

E3. The method of E2, wherein at least one selected from the group consisting of the first signal data and the second signal data represents, as a salient feature, an anchor.

F1. A method, comprising:
obtaining a sample of ambient content comprising a content signal having multiple instances of a watermark message at least substantially imperceptibly embedded therein, the watermark message conveying signal data representing a plurality of anchors within the content signal, each anchor representing a location in the content signal corresponding to a fingerprint of the content signal;
aggregating multiple instances of the watermark message;
decoding the watermark message from the aggregated instances, thereby extracting the signal data from the watermark message;
decoding the extracted signal data to discern the plurality of anchors within the content signal;
deriving a fingerprint of the content signal based on the extracted signal data;
accessing a data repository containing data representing a set of reference characteristics, each reference characteristic corresponding to a reference content signal; and
by reference to the discerned plurality of anchors, the derived fingerprint, and a reference characteristic, determining whether the sample includes a reference content signal.

F2. The method of F1, wherein the signal data represents a multidimensional function of the content signal and wherein the plurality of anchors correspond to at least one salient point of the multidimensional function.

F3. The method of F2, wherein at least one of the dimensions of the multidimensional function is a time dimension.

F4. The method F3, wherein the at least one salient point includes at least one selected from the group consisting of a local maxima, a local minima, and a zero crossing of said multidimensional function in at least one of the dimensions.

F5 The method of F4, wherein the plurality of anchors are computed from a time dimension of the multidimensional function.

F6. The method of F5, wherein at least one of the dimensions of the multidimensional function is a non-time dimension.

F7. The method of any of F6, wherein deriving the fingerprint of the sample comprises deriving a fingerprint based on the extracted signal data.

F8. The method of any of F1 to F7, wherein deriving the fingerprint comprises deriving the fingerprint from at least one salient point of the multidimensional function.

F9. The method of F8, wherein deriving the fingerprint comprises deriving the fingerprint from a time dimension of the multidimensional function.

F10. The method of any of F8 to F9, wherein deriving the fingerprint comprises deriving the fingerprint from a non-time dimension of the multidimensional function.

F11. The method of any of F1 to F10, wherein deriving the fingerprint comprises deriving the fingerprint from the decoded signal data.

F12. The method of F11, wherein deriving the fingerprint from the decoded signal data comprises deriving the fingerprint from the discerned plurality of anchors.

F13. The method of any of F1 to F12, wherein a reference characteristic of a reference content signal comprises:
a plurality of anchors, each anchor representing a location in the reference content signal corresponding to a fingerprint of the sample; and
a plurality of fingerprints of the reference content signal, each fingerprint corresponding to an anchor.

F14. The method of F13, further comprising:
generating a first set of correspondences between the anchors represented by the signal data and the anchors in the reference characteristics, wherein corresponding anchors have equivalent fingerprints; and
determining that the sample includes a reference content signal when a plurality of corresponding anchors in the first set of correspondences have a predetermined relationship.

F15. The method of claim F14, wherein the predetermined relationship is present when the plurality of corresponding anchors in the first set of correspondences are at least substantially linearly related.

F16. The method of claim F15, wherein the predetermined relationship is present when the plurality of corresponding anchors are linearly related.

F17. The method of any of F1 to F16, further comprising deriving a characteristic of the sample, wherein determining whether the sample includes a reference content signal further comprises determining, by reference to the derived characteristic of the sample and the reference characteristic, whether the sample includes a reference content signal.

F18. The method of F17, wherein the derived characteristic of the sample comprises a plurality of anchors, each anchor representing a location in the sample corresponding to a fingerprint of the sample.

F19. The method of any of F17 to F18, wherein the derived fingerprint of the sample comprises a plurality of fingerprints of the sample.

F20. The method of any of F17 to F19, further comprising:
  generating a second set of correspondences between the anchors in the derived characteristics of the sample and the anchors in the reference characteristics, wherein corresponding anchors have equivalent fingerprints; and
  determining that the sample includes a reference content signal when a plurality of corresponding anchors in the second set of correspondences have a predetermined relationship.

F21. The method of F20, wherein the second set of correspondences is weighted differently from the first set of correspondences.

F22. The method of claim F21, wherein the second set of correspondences is weighted less than the first set of correspondences.

G1. A method, comprising:
  obtaining a sample of ambient content comprising a content signal having a watermark signal embedded therein;
  processing at least a portion of the sample to estimate a distortion of the content signal in the sampled ambient content;
  deriving a characteristic of the sample; and
  accessing a data repository containing data representing a set of reference characteristics, each reference characteristic corresponding to a reference content signal; and
  by reference to the estimated distortion and the derived characteristic, determining whether the sample includes a reference content signal.

G2. The method of G1, wherein the watermark signal is at least substantially imperceptibly embedded in the content signal.

G3. The method of any of G1 to G2, further comprising modifying the derived characteristic of the sample based on the estimated distortion, wherein determining whether the sample includes a reference content signal further comprises determining, by reference to the modified derived characteristic of the sample and the reference characteristic, whether the sample includes a reference content signal.

G4. The method of any of G1 to G3, wherein a reference characteristic of a reference content signal comprises:
  a plurality of anchors, each anchor representing a location in the reference content signal corresponding to a fingerprint of the sample; and
  a plurality of fingerprints of the reference content signal, each fingerprint corresponding to an anchor.

G5. The method of any of G1 to G4, wherein the derived characteristic of the sample comprises a plurality of anchors, each anchor representing a location in the sample corresponding to a fingerprint of the sample.

G6. The method of any of G1 to G5, wherein the derived fingerprint of the sample comprises a plurality of fingerprints of the sample.

G7. The method of any of G1 to G6, further comprising:
  generating correspondences between the anchors in the modified derived characteristic and the anchors in the reference characteristics, wherein corresponding anchors have equivalent fingerprints; and
  determining that the sample includes a reference content signal when a plurality of corresponding anchors have a predetermined relationship.

G8. The method of G7, wherein the predetermined relationship is present when the plurality of corresponding anchors in the first set of correspondences are at least substantially linearly related.

G9. The method of claim G8, wherein the predetermined relationship is present when the plurality of corresponding anchors are linearly related.

G10. The method of any of claims G1 to G9, further comprising:
  by reference to the estimated distortion, generating correspondences between the anchors in the derived characteristic and the anchors in the reference characteristics, wherein corresponding anchors have equivalent fingerprints; and
  determining that the sample includes a reference content signal when a plurality of corresponding anchors have a predetermined relationship.

G11. The method of claim G10, wherein the act of generating correspondences by reference to the estimated distortion comprises:
  generating at least one preliminary correspondence between the anchors in the derived characteristic and the anchors in the reference characteristics; and
  modifying the at least one preliminary correspondence based on the estimated distortion.

H1. A method, comprising:
  obtaining a sample of ambient content;
  determining whether the sample comprises a content signal having a watermark signal embedded therein;
  upon determining that the sample comprises the content signal:
    processing at least a portion of the sample to estimate a distortion of the content signal within the sampled ambient content;
    deriving a characteristic of the sample;
    accessing a data repository containing data representing a set of reference characteristics, each reference characteristic corresponding to a reference content signal; and
    by reference to the estimated distortion and the derived characteristic, determining whether the sample includes a reference content signal.

I1. A system comprising:
  a first device including one or more processors; and
  a first non-transitory computer readable medium communicatively coupled to the first device and containing software instructions for configuring the one or more processors of the first device to perform any of the acts as recited in any of claims A1 to H1.

I2. The system of claim I1, wherein the first device includes an electronic device of a type selected from the group consisting of a cell phone, a smartphone, a tablet computer, a laptop computer, a desktop computer, a wearable electronic device and a server.

I3. The system of any of claims I1 TO I2, wherein the non-transitory computer readable medium is communicatively coupled to the first device over a wireless link.

I4. The system of any of claims I1 to I3, wherein the non-transitory computer readable medium is communicatively coupled to the first device over a wired link.

I5. The system of any of claims I1 to I4, wherein the first device includes a microphone.

I6 The system of any of I1 to I5, further comprising a second device communicatively coupled to the first non-transitory computer readable medium and including one or more processors, wherein the first non-transitory computer readable medium contains software instructions for configuring the one or more processors of the second device to perform any of the acts as recited in any of claims A1 to H1.

I7. The system of I6, wherein the second device includes an electronic device of a type selected from the group consisting of a cell phone, a smartphone, a tablet computer, a laptop computer, a desktop computer, a wearable electronic device and a server.

I8. The system of I7, wherein the second device and the first device include different types of electronic devices.

I9. The system of I32, wherein the second device and the first device include the same type of electronic device.

I10. The system of any of I1 to I9 wherein the first non-transitory computer readable medium contains software instructions for configuring the processors of the first and second devices to perform different acts.

I11. The system of any of I1 to I9, wherein the first non-transitory computer readable medium contains software instructions for configuring the processors of the first and second devices to perform the same act.

IX. Concluding Remarks

Having described and illustrated the principles of the technology with reference to specific implementations, it will be recognized that the technology can be implemented in many other, different, forms. For example, although techniques for generating signal data, constructing and embedding watermarks, and extracting signal data from watermark messages has been described with respect to sound-based content signals, it will be appreciated that these techniques may also be adapted for imagery-based content signals (e.g., still imagery, video imagery, etc.), surface textures (e.g., of 3D printed objects, injection molded objects, CNC-machined objects, etc.), and the like. In another example, the match-finding process (212) may be based on one or more query characteristics and not upon any values representing the same. In such a case, the data repository would contain the reference characteristics themselves, as opposed to the values representing the reference characteristics.

To provide a comprehensive disclosure without unduly lengthening this document each of the above patent documents are hereby incorporated herein by reference in its entirety.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors/multi-core processors (including parallel processors), and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention. Accordingly, all such modifications are intended to be included within the scope of the invention as defined in the claims. For example, skilled persons will appreciate that the subject matter of any embodiment, example or portion thereof can be combined with subject matter of some or all of the other embodiments or examples disclosed herein, except where such combinations are mutually exclusive. It will be obvious to those having skill in the art that many changes may be made to the details of the above-described embodiments without departing from the underlying principles of the invention. The scope of the present invention should, therefore, be determined by the following claims, with equivalents of the claims to be included therein.

What is claimed is:

1. A method, comprising:
obtaining a sample of ambient audio content comprising a content signal having multiple instances of a watermark message embedded therein, the watermark message conveying signal data representing a characteristic of the content signal;
utilizing one or more programmed processors for:
aggregating multiple instances of the watermark message;
decoding the watermark message from the aggregated multiple instances, thereby decoding the signal data representing the characteristic of the content signal from the watermark message;
deriving a characteristic of the sample of ambient audio content, in which the derived characteristic comprises a plurality of anchors, with each anchor of the plurality of anchors representing a location in a reference content signal corresponding to a fingerprint of the sample of ambient audio content;
modifying the derived characteristic of the sample of ambient audio content based on the decoded signal data representing the characteristic of the content signal, thereby producing a modified characteristic of the sample of ambient audio content, wherein modifying the derived characteristic comprises modifying at least a portion of the derived characteristic based on the decoded signal data representing the characteristic of the content signal conveyed by the watermark message, and wherein modifying the derived characteristic comprises performing a noise reduction process on at least a portion of the derived characteristic to remove at least one of the plurality of anchors;
accessing a data repository containing data representing a set of reference characteristics, each reference characteristic of the set of reference characteristics corresponding to one or more reference content signals; and
by reference to the modified characteristic and a reference characteristic, determining whether the sample of ambient audio content includes the reference content signal corresponding to the fingerprint of the sample of ambient audio content.

2. The method of claim 1, wherein the signal data represents a plurality of characteristics of the content signal.

3. The method of claim 1, wherein a characteristic represented by the signal data comprises an anchor within the content signal, the anchor representing a location in the content signal corresponding to a fingerprint of the ambient audio content.

4. The method of claim 3, wherein a characteristic represented by the signal data does not include the fingerprint.

5. The method of claim 1, wherein determining whether the sample corresponds to the reference content signal comprises decoding the signal data to discern a characteristic of the content signal conveyed by the watermark message.

6. The method of claim 1, wherein the derived characteristic comprises a plurality of fingerprints of the sample.

7. The method of claim 1, wherein the reference characteristic of the reference content signal comprises:
  a plurality of anchors, each anchor representing a location in the reference content signal corresponding to a fingerprint of the sample; and
  a plurality of fingerprints of the reference content signal, each fingerprint corresponding to an anchor.

8. The method of claim 7, further comprising decoding the signal data to discern a characteristic of the content signal conveyed by the watermark message.

9. The method of claim 1, further comprising performing a sparse vector reconstruction process on the decoded signal data to discern the characteristic of the content signal conveyed by the watermark message.

10. The method of claim 1, wherein the noise reduction process includes a de-noising process.

11. The method of claim 7, further comprising:
  generating correspondences between the anchors in the modified derived characteristics and the anchors in the reference characteristics; and
  determining that the sample includes a reference content signal when a plurality of corresponding anchors have a predetermined relationship.

12. The method of claim 11, wherein the predetermined relationship is present when the plurality of corresponding anchors are at least substantially linearly related.

13. The method of claim 12, wherein the predetermined relationship is present when the plurality of corresponding anchors are linearly related.

14. A method, comprising:
obtaining a sample of ambient content;
analyzing a frequency domain representation of the sample of ambient content to determine whether the sample of ambient content comprises a content signal having a watermark message embedded therein;
upon determining that the sample of ambient content comprises the content signal, determining whether the watermark message conveys signal data representing a characteristic of the content signal;
upon determining that the sample contains the watermark message, utilizing one or more processors for:
  decoding the signal data from the watermark message;
  deriving a characteristic of the sample of ambient content, in which the derived characteristic comprises a plurality of anchors, with each anchor of the plurality of anchors representing a location in a reference content signal corresponding to a fingerprint of the sample of ambient content; and
  modifying the derived characteristic of the sample of ambient content based on the decoded signal data from the watermark message, thereby producing a modified derived characteristic of the sample of ambient content, wherein modifying the derived characteristic comprises modifying at least a portion of the derived characteristic based on the characteristic of the ambient signal conveyed by the watermark message, and wherein modifying the derived characteristic comprises performing a noise reduction process on at least a portion of the derived characteristic to remove at least one of the plurality of anchors;
accessing a data repository containing data representing a set of reference characteristics, each reference characteristic of the set of reference characteristics corresponding to one or more reference content signals; and
by reference to the modified derived characteristic and a reference characteristic, determining whether the sample of ambient content includes the reference content signal corresponding to the fingerprint of the sample of ambient content.

* * * * *